(12) United States Patent
Gutlansky et al.

(10) Patent No.: US 11,947,356 B2
(45) Date of Patent: Apr. 2, 2024

(54) EVALUATING PULLOVERS FOR AUTONOMOUS VEHICLES

(71) Applicant: Waymo LLC, Mountain View, CA (US)

(72) Inventors: Daniella Gutlansky, San Francisco, CA (US); Mishika Vora, Hayward, CA (US); Tiffany Washburn, Sunnyvale, CA (US); Yu Zheng, Milpitas, CA (US); Sandra Lennie, San Mateo, CA (US)

(73) Assignee: Waymo LLC, Mountain View, CA (US)

( * ) Notice: Subject to any disclaimer, the term of this patent is extended or adjusted under 35 U.S.C. 154(b) by 172 days.

(21) Appl. No.: 17/229,054

(22) Filed: Apr. 13, 2021

(65) Prior Publication Data

US 2022/0326711 A1    Oct. 13, 2022

(51) Int. Cl.
*G05D 1/02* (2020.01)
*G05D 1/00* (2006.01)
*G06V 10/25* (2022.01)

(52) U.S. Cl.
CPC ......... *G05D 1/0214* (2013.01); *G05D 1/0055* (2013.01); *G05D 1/0088* (2013.01); *G06V 10/25* (2022.01); *G05D 2201/0213* (2013.01)

(58) Field of Classification Search
CPC .. G05D 1/0214; G05D 1/0055; G05D 1/0088; G05D 2201/0213; G06V 10/25
See application file for complete search history.

(56) References Cited

U.S. PATENT DOCUMENTS

| | | | |
|---|---|---|---|
| 10,088,846 B2 | 10/2018 | Gao et al. | |
| 10,545,502 B2 | 1/2020 | Goldberg et al. | |
| 10,599,546 B1* | 3/2020 | Walther | G06F 11/3457 |
| 10,718,622 B2 | 7/2020 | Colijn et al. | |
| 11,062,602 B1* | 7/2021 | Beaurepaire | G08G 1/146 |
| 11,377,108 B2* | 7/2022 | Ravichandran | B60W 50/10 |
| 11,405,462 B1* | 8/2022 | Puchalski | H04L 63/1425 |
| 2016/0171891 A1* | 6/2016 | Banatwala | G08G 1/144 |
| | | | 340/932.2 |
| 2016/0371607 A1* | 12/2016 | Rosen | G08G 1/141 |
| 2017/0274901 A1* | 9/2017 | Herbach | B60W 10/20 |
| 2018/0304926 A1* | 10/2018 | Ghose | B62D 15/0285 |
| 2019/0220011 A1* | 7/2019 | Della Penna | G05D 1/0212 |

(Continued)

FOREIGN PATENT DOCUMENTS

| | | | | |
|---|---|---|---|---|
| EP | 1701323 A1 * | 9/2006 | | G08G 1/14 |
| WO | WO-2017033066 A1 * | 3/2017 | | G06Q 10/0631 |

*Primary Examiner* — Shelley Chen
(74) *Attorney, Agent, or Firm* — Botos Churchill IP Law

(57) ABSTRACT

Aspects of the disclosure relate to evaluating pullovers for autonomous vehicles. In one instance, a set of potential pullover locations within a predetermined distance of a destination may be identified. Whether any of the potential pullover locations of the set include one or more of a plurality of predetermined types of regions of interest where a vehicle should not park for an extended period of time may be determined. A pullover location is identified based on the determination. The identified pullover location may be compared to a pullover location identified by autonomous vehicle control software in order to evaluate the pullover location identified by the autonomous vehicle control software.

22 Claims, 12 Drawing Sheets

(56) References Cited

U.S. PATENT DOCUMENTS

| | | | |
|---|---|---|---|
| 2019/0318267 A1* | 10/2019 | Zhang | G06N 20/00 |
| 2019/0324458 A1* | 10/2019 | Sadeghi | G06F 8/65 |
| 2019/0378363 A1* | 12/2019 | Becker | G06Q 30/08 |
| 2019/0384292 A1* | 12/2019 | Aragon | B60W 40/09 |
| 2020/0011671 A1* | 1/2020 | Puri | G01C 21/3691 |
| 2020/0050536 A1* | 2/2020 | Nygaard | G06F 11/3684 |
| 2020/0302798 A1 | 9/2020 | Zhang | |
| 2021/0097559 A1* | 4/2021 | Albada | G06Q 50/30 |
| 2021/0261156 A1* | 8/2021 | Ackenhausen | B60W 60/0025 |
| 2021/0302981 A1* | 9/2021 | Case | G05D 1/0088 |
| 2021/0383699 A1* | 12/2021 | Xiao | G08G 1/096827 |
| 2022/0101633 A1* | 3/2022 | Nishiyama | G06T 7/20 |
| 2022/0129814 A1* | 4/2022 | Ju | G06Q 10/06315 |

* cited by examiner

1000

EVALUATING PULLOVERS FOR AUTONOMOUS VEHICLES

BACKGROUND

Autonomous vehicles, for instance, vehicles that may not require a human driver, can be used to aid in the transport of passengers or items from one location to another. Such vehicles may operate in a fully autonomous mode where passengers may provide some initial input, such as a pickup or destination location, and the vehicle maneuvers itself to that location. When approaching the location or at any point during a trip, an autonomous vehicle may look for locations to stop the vehicle. These locations may be used, for example, brief stops to pick up and/or drop off passengers and/or goods for a transportation service.

BRIEF SUMMARY

Aspects of the disclosure provide a method of evaluating pullovers for autonomous vehicles. The method includes identifying, by one or more processors, from log data a set of potential pullover locations within a predetermined distance of a destination of the log data; determining, by the one or more processors, whether any of the potential pullover locations of the set include one or more of a plurality of predetermined types of regions of interest; identifying, by the one or more processors, a pullover location based on the determination; and comparing, by the one or more processors, the identified pullover location to a pullover location identified by autonomous vehicle control software in order to evaluate the pullover location identified by the autonomous vehicle control software.

In one example, the log data is simulated log data. In another example, the log data is actual log data generated by an autonomous vehicle. In another example, the destination is a pickup or drop off location for a passenger or good. In another example, the destination is the pullover location identified by the autonomous vehicle control software. In another example, identifying the set of potential pullover locations includes evaluating a plurality of splices of an edge of a roadway to determine whether any objects are located within an area of each given splice of the plurality of splices where an autonomous vehicle would be if parked adjacent to a portion of the edge of each given splice. In this example, the splices of the plurality of splices are shorter in length than the autonomous vehicle. In addition, the method also comprises merging adjacent splices of the plurality of splices where an autonomous vehicle would overlap with a common type of region of interest if parked adjacent to a portion of the edge of each of the merged adjacent splices. In addition, identifying the set of potential pullover locations is based on the merged adjacent splices and at least one unmerged splice.

In another example, the method also includes discarding any of the potential pullover locations of the set which at least partially overlap with one of a plurality of predetermined types of regions of interest identified as unsafe. In this example, the one of a plurality of predetermined types of regions of interest identified as unsafe includes railroad tracks. In another example, each of the plurality of predetermined types of regions of interest is associated with a ranked bucket, and wherein identifying the identified pullover location is further based on the ranked buckets associated with each of the plurality of predetermined types of regions of interest. In another example, the method also includes identifying, for each given one of the potential pullover locations of the set, one of a plurality of ranked buckets based on any of the plurality of predetermined types of regions of interest which at least partially overlap with the given one, and wherein identifying the pullover location is further based on the identified ones of the plurality of ranked buckets. In this example, each of the plurality of ranked buckets is associated with one or more of the plurality of predetermined types of regions of interest. In another example, the identified pullover location includes the vehicle double parking. In another example, identifying the identified pullover location is further based on whether there is a bicycle lane adjacent to the identified pullover location. In another example, evaluating the pullover location identified by autonomous vehicle control software further includes determining whether the pullover location identified by autonomous vehicle control software was a success based on the comparison. In another example, evaluating the pullover location identified by autonomous vehicle control software further includes determining whether the pullover location identified by autonomous vehicle control software was a failure based on the comparison.

DETAILED DESCRIPTION

Overview

Figure 1:
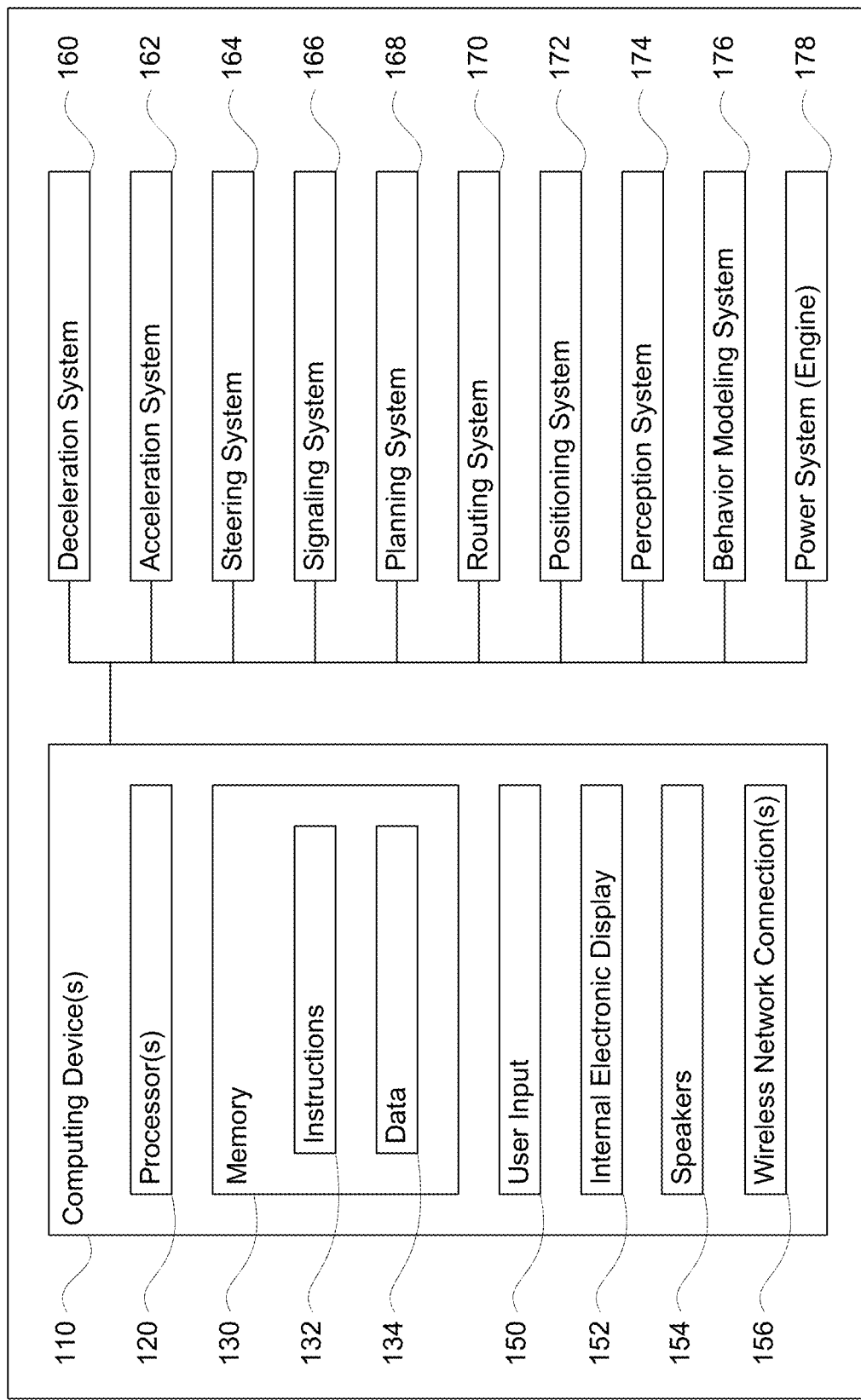
FIG. 1 is a functional diagram of an example vehicle in accordance with an exemplary embodiment.

The technology relates to evaluating pullovers for autonomous vehicles. By doing so, engineers may be able to both determine how changes to autonomous vehicle control software affect how an autonomous vehicle selects pullover locations as well as to implement improvements in selecting pullover locations. For instance, the vehicle's systems may continuously look for pullover locations to stop the vehicle. These locations may be used for brief stops or pullovers for a short period of time, such as five minutes or more or less, for example, in order to pick up and/or drop off passengers and/or goods. Typically, autonomous vehicles may look for and select a pullover location when the vehicle is within some distance of a destination using a cost-based analysis. For each pullover location identified, it may be evaluated for example, by determining which pullover location has the lowest cost. Costs may be assessed based on inconvenience to a passenger of the vehicle (e.g. distance to the destination), inconvenience to other road users (e.g. likelihood of stopping or slowing the flow of traffic), orientation of the vehicle relative to its route to a next destination, inconvenience to other vehicles, etc.

In order to evaluate how a particular version of the autonomous vehicle control software performs, an evaluation framework may be used to identify the "best" pullover location available. This pullover location may be compared to a pullover location selected or identified by the autonomous vehicle control software in a simulation or from log data (e.g. an actual selection by a real vehicle) in order for the vehicle to stop for a pickup or drop off of passengers or goods, or various other reasons. The simulations may be log-based simulations which are run using log data collected by a vehicle over some brief period of time as the vehicle approaches a destination. The log data may include information from the vehicle's various systems. At the same time, the actual vehicle is replaced with a virtual or simulated autonomous vehicle which can make decisions using the autonomous vehicle control software. Alternatively, the "log data" may be simulated, that is may be created by a human operator as opposed to being generated from a real vehicle driving in the world. By using simulations, the autonomous vehicle control software can be rigorously evaluated.

As noted above, the log data and/or results of a simulation based on actual or simulated log data may include an identified pullover location selected by the autonomous vehicle control software. Using the simulated or actual log data, the evaluation framework may first identify a set of potential pullover locations within a predetermined distance of the destination. Within this distance, the area adjacent to the edge of a roadway may be evaluated to determine whether the edge (e.g. the curb) is occupied by an object.

For each potential pullover location of the set, pullover location may be analyzed to determine whether it includes or at least partially overlaps with a region of interest. These regions of interest may be identified in pre-stored map information used by the autonomous vehicle control software to control the vehicle and/or from other sources of information. A region of interest may represent an area where a vehicle (any vehicle) should not park for an extended period of time. Each region of interest may be classified into a plurality of ranked buckets.

The set of potential pullover locations may then be evaluated to identify a pullover location. This pullover location may be one of the set of potential pullover locations or may actually be a location where the vehicle double parks adjacent to one of the set of potential pullover locations. In this regard, the potential pullover locations of the set may be evaluated using the ranked bucket for the worst ranked region of interest that at least partially overlaps with the potential pullover location in order to identify the "best" pullover location.

The results of the comparisons may be used to determine or label whether a simulated or actual pullover was a success or a failure. A "failure" may include a situation where there is an acceptable spot that is closer to the destination and the same ranked bucket or a higher ranked bucket even if farther from the destination. A "success" may include a situation in which no better pullover location is found. The actual location was the highest ranked pullover location or at least there was no other high-ranking pullover location. Situations in which all pullover locations within the predetermined distance are considered unsafe or there are none available, may be considered neither a success nor a failure, but rather may suggest an issue with the destination itself and may be flagged for review.

The features described herein may allow for the evaluation of pullovers for autonomous vehicles. By doing so, engineers may be able to both determine how changes to autonomous vehicle control software affect how an autonomous vehicle selects pullover locations as well as to implement improvements in selecting pullover locations.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more button, mouse, keyboard, touch screen and/or microphone), various electronic displays (e.g., a monitor having a screen or any other electrical device that is operable to display information), and speakers 154 to provide information to a passenger of the vehicle 100 or others as needed. For example, electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be part of an autonomous control system for the vehicle 100 and may be capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of vehicle 100 in accordance with the instructions 134 of memory 130 in the autonomous driving mode.

As an example, the computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. The computing devices 110 may also use the signaling system 166 in order to signal the vehicle's intent to other drivers or vehicles, for example, by lighting turn signals or brake lights when needed.

Routing system 170 may be used by the computing devices 110 in order to generate a route to a destination using map information. Planning system 168 may be used by computing device 110 in order to generate short-term trajectories that allow the vehicle to follow routes generated by the routing system. In this regard, the planning system 168 and/or routing system 166 may store detailed map information, e.g., highly detailed maps identifying a road network including the shape and elevation of roadways, lane lines, intersections, crosswalks, speed limits, traffic signals, buildings (including types or categories, footprints, number of stories, floors, levels, etc.), signs, real time traffic information (updated as received from a remote computing device, as such as the computing devices 410 discussed below or other computing devices), pullover spots, vegetation, or other such objects and information.

Figure 2A:
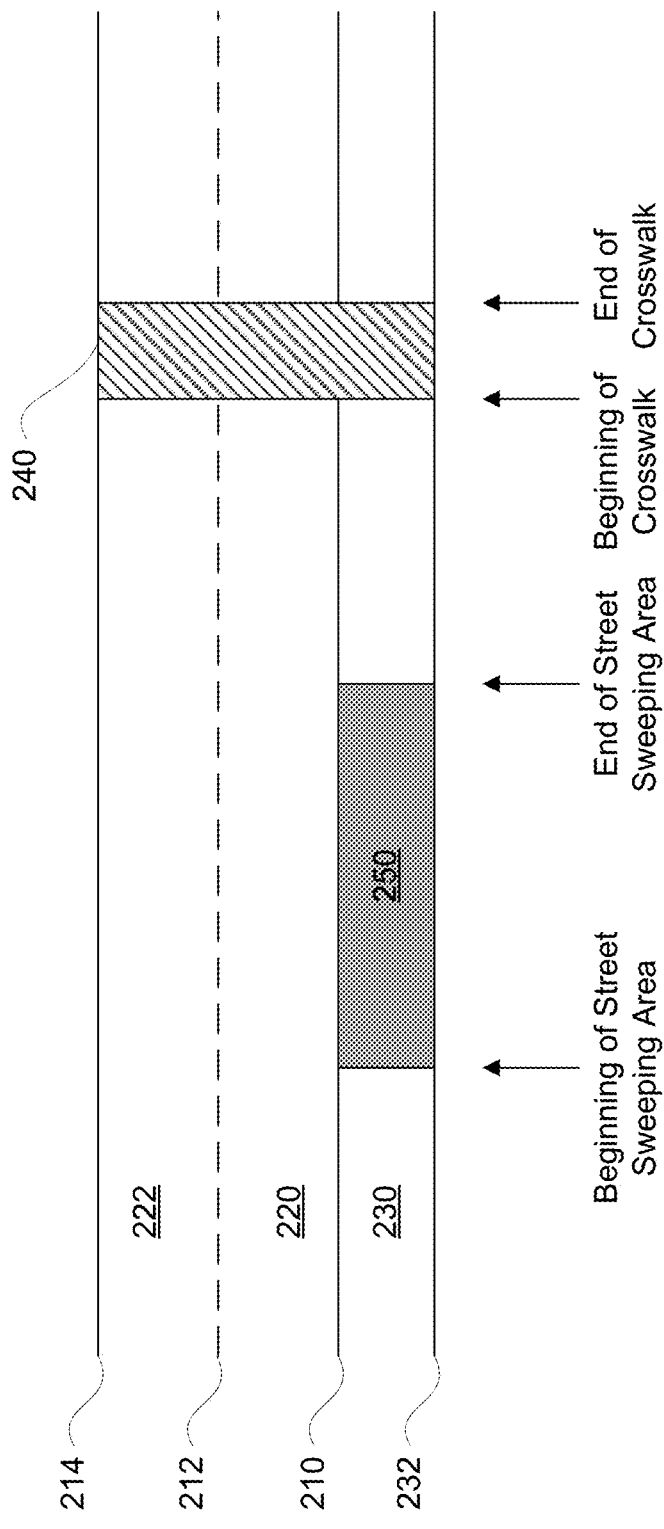
FIGS. 2A and 2B are an example of map information in accordance with aspects of the disclosure.
Figure 2B:
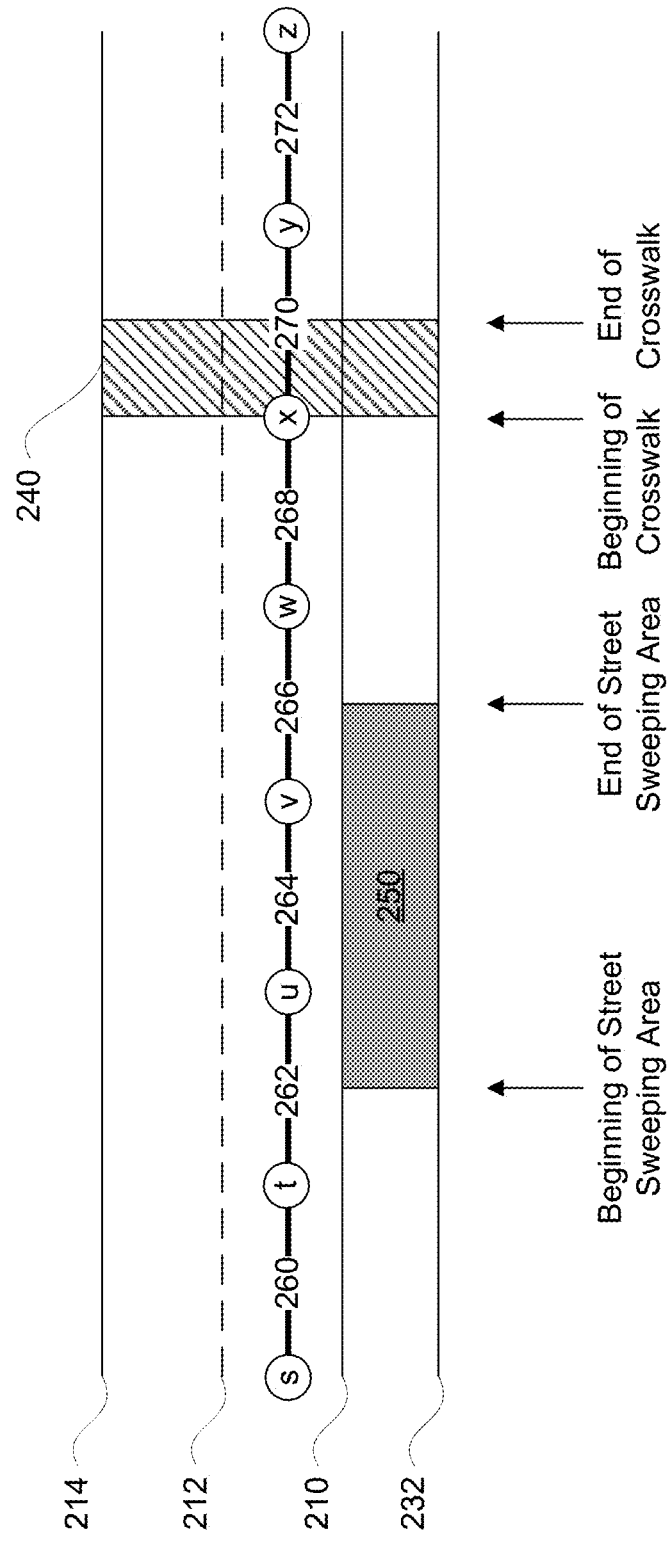

FIGS. 2A and 2B are an example of map information 200 for a small section of roadway. FIG. 2A depicts a portion of the map information 200 that includes information identifying the shape, location, and other characteristics of lane markers or lane lines 210, 212, 214, which define lanes 220, 222. The map information also identifies the shape, location, and other characteristics of shoulder area 230 and curb 232 adjacent to shoulder area. In addition to the aforementioned features and information, the map information may also include information that identifies the direction of traffic for each lane as well as information that allows the computing devices 110 to determine whether the vehicle has the right of way to complete a particular maneuver (i.e. complete a turn or cross a lane of traffic or intersection).

In addition to the aforementioned physical feature information, the map information may include a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable. For example, FIG. 2B depicts a plurality of nodes s, t, u, v, w, x, y, z, and edges 260, 262, 264, 266, 268, 270, 272 which extend between pairs of such nodes. For example, edge 260 extends between nodes s (starting node of edge 260) and t (ending node of edge 260), edge 262 extends between nodes t (starting node of edge 262) and u (ending node of edge 262), and so on.

The map information may also identify, for instance include flags or labels for, regions of interest. A region of interest may represent an area where a vehicle (any vehicle) could potentially stop or park whether or not the vehicle should park or stop for an extended period of time or even at all. In this regard, there may be a plurality of different types of regions of interest such as public or private parking lots, individual (e.g. designated) parking spaces, disability parking spaces, motorcycle parking, taxi lines or zones, commercial loading or unloading zones, street sweeping areas, funeral zones, certain types of road surfaces (e.g. dirt, gravel, beaches), adjacent to or in residential driveways, adjacent to mailboxes, adjacent to or in commercial driveways, alternative fuel stations, yellow curbs, red curbs, adjacent to wheelchair access ramps, no stopping or standing zones, bus lanes or stops, crosswalks, fire lanes, adjacent to fire hydrants, railroad tracks, etc. For example, returning to FIG. 2B, the map information 200 also includes information identifying the shape, location, beginning location, end location, and other characteristics of regions of interest such as a crosswalk 240 as well as a street sweeping area 250.

The routing system 166 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 172 may also include other devices in communication with the computing devices computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other vehicles, obstacles in the roadway, traffic signals, signs, trees, etc. For example, the perception system 174 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location.

Figure 3:
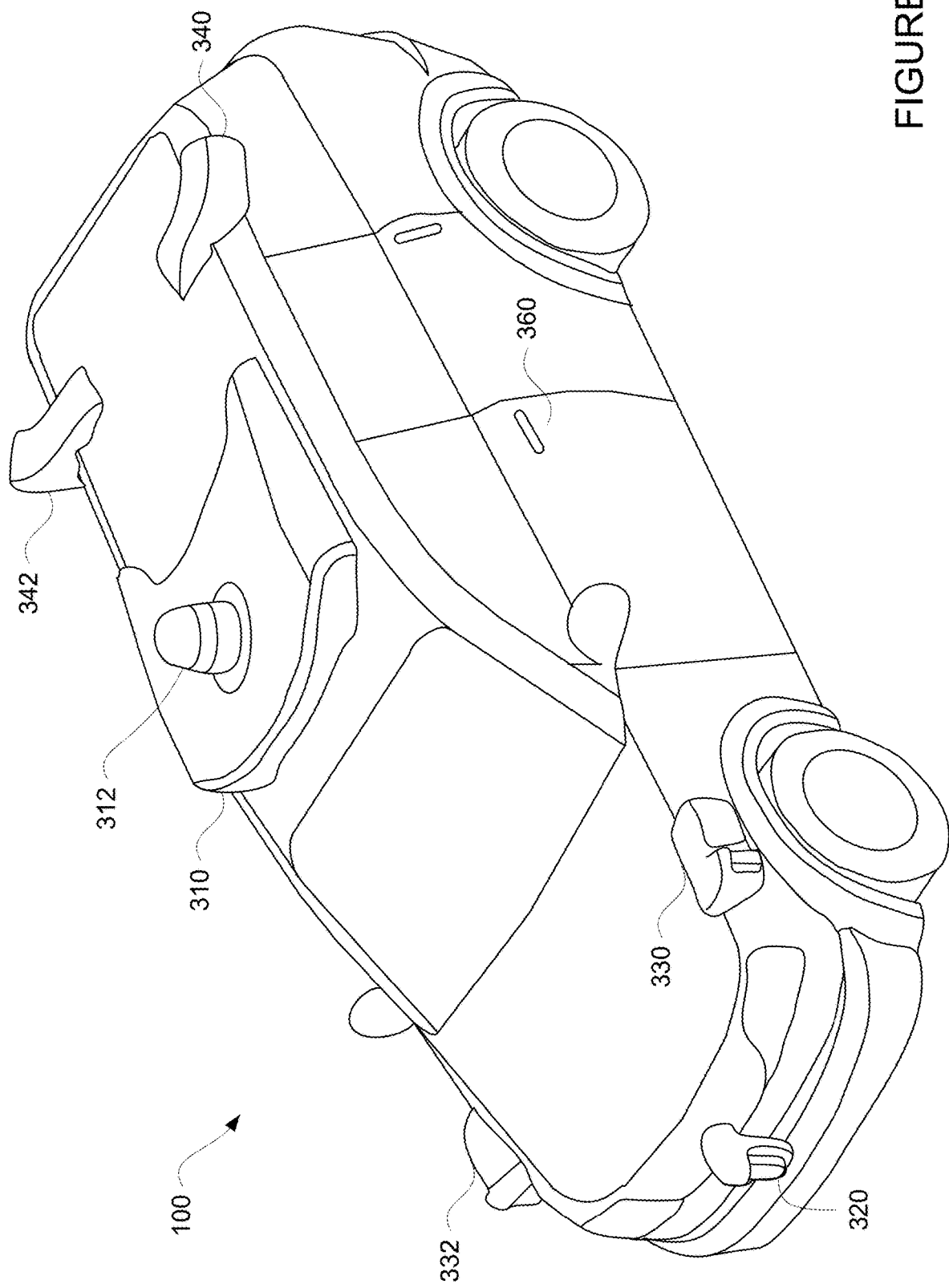
FIG. 3 is an example external view of a vehicle in accordance with aspects of the disclosure.

For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module of the behavior modeling system 176 which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 170. In this regard, the trajectories may define the specific characteristics of acceleration, deceleration, speed, etc. to allow the vehicle to follow the route towards reaching a destination. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
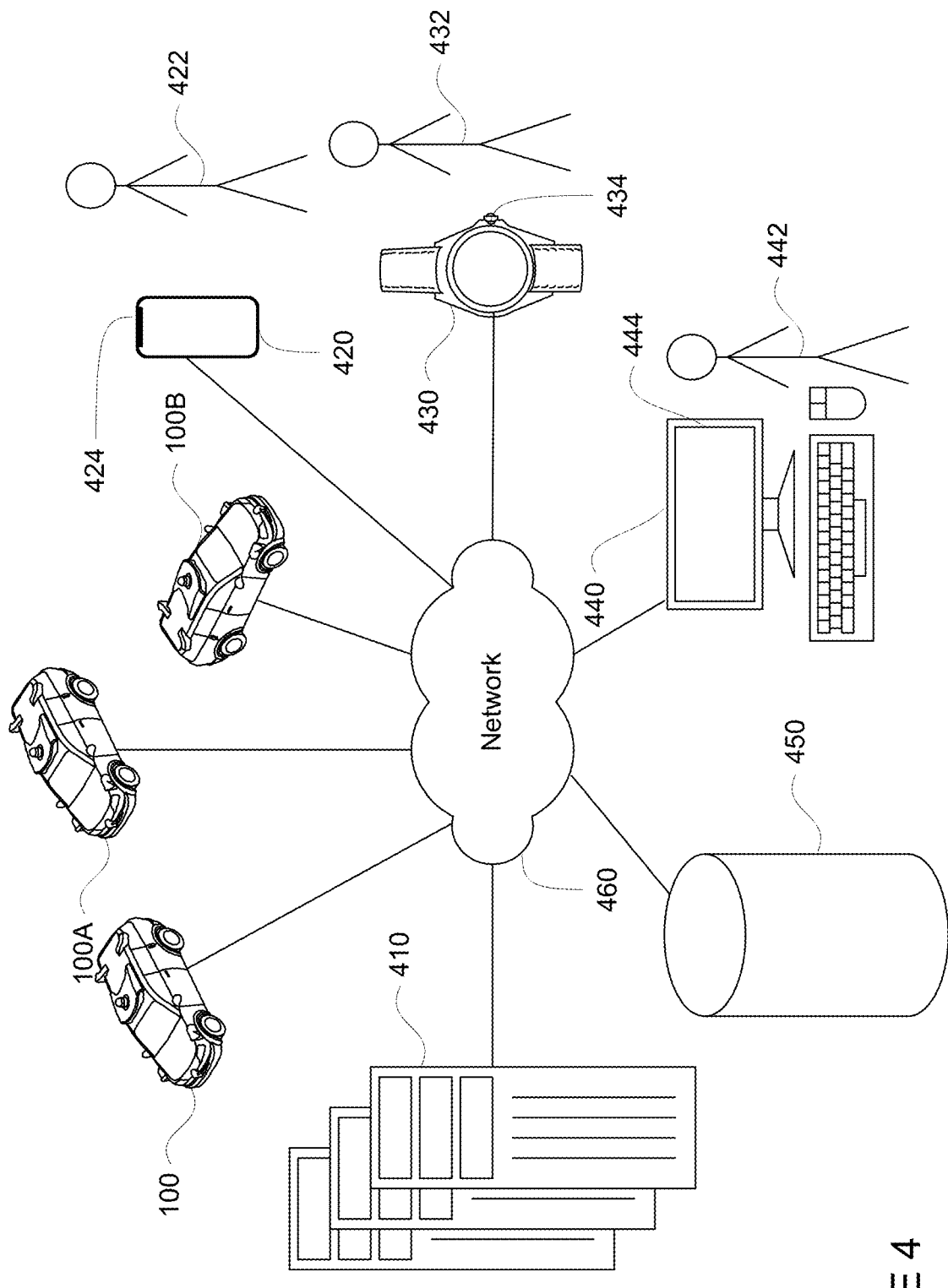
FIG. 4 is a pictorial diagram of an example system in accordance with aspects of the disclosure.
Figure 5:
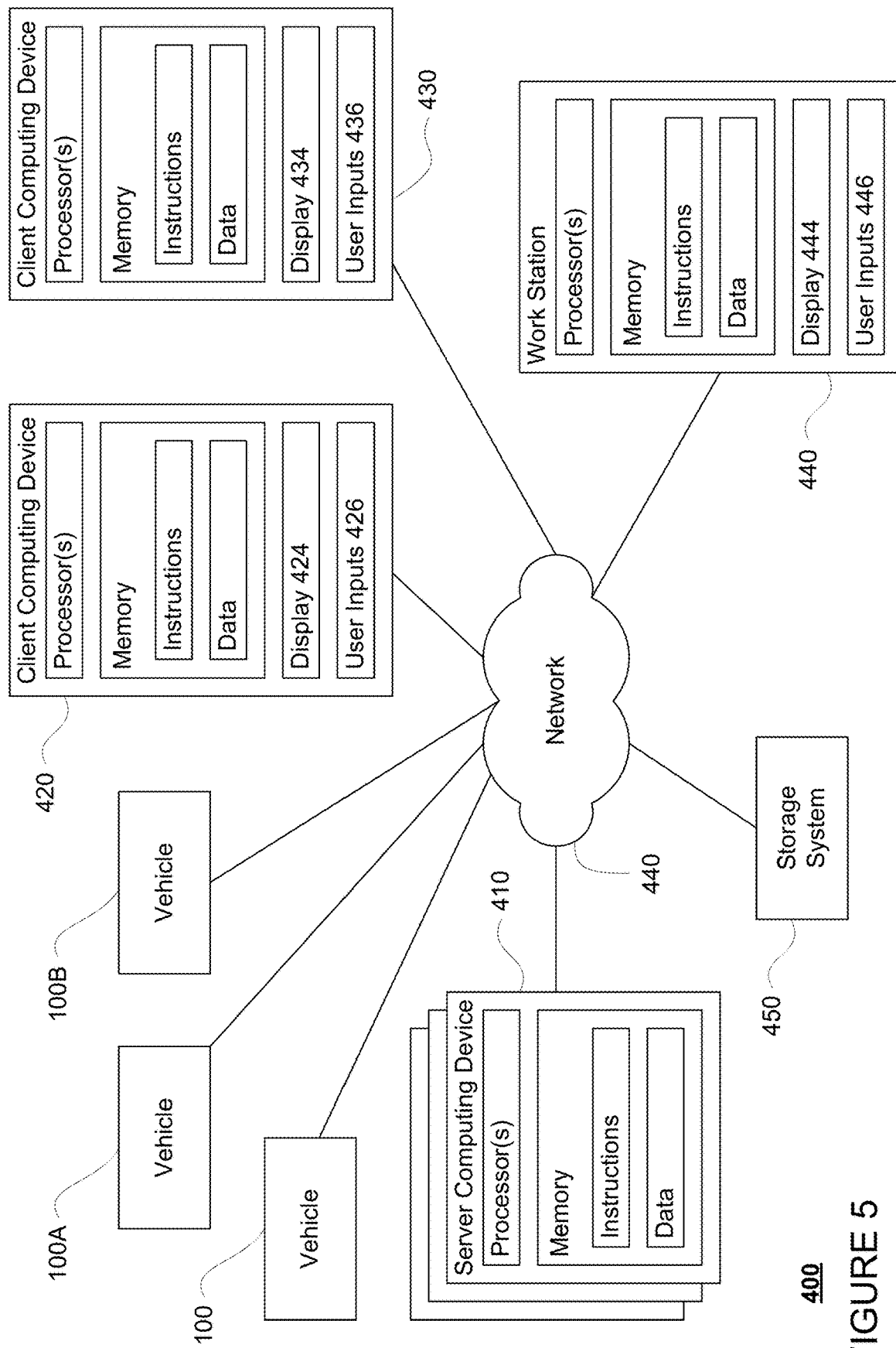
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100A and vehicle 100B, which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A or vehicle 100B as well as computing devices 420, 430, 440 via the network 460. For example, vehicles 100, 100A, 100B, may be a part of a fleet of vehicles that can be dispatched by server computing devices to various locations. In this regard, the server computing devices 410 may function as a fleet management system which can be used to dispatch vehicles such as vehicles 100, 100A, 100B to different locations in order to pick up and drop off passengers. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 5. As an example the user may input information using a small keyboard, a keypad, microphone, using visual signals with a camera, or a touch screen.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For instance, storage system 450 may store log data. This log data may include data generated by the various systems of a vehicle, such as vehicle 100, while the vehicle is being operated in a manual driving mode or an autonomous driving mode. For instance, the log data may include sensor data generated by a perception system, such as perception system 172 of vehicle 100. As an example, the sensor data may include raw sensor data as well as data identifying defining characteristics of perceived objects such as shape, location, orientation, speed, etc. of objects such as vehicles, pedestrians, bicyclists, vegetation, curbs, lane lines, sidewalks, crosswalks, buildings, etc. The log data may also include "event" data identifying different types of events such as collisions or near collisions with other objects, planned trajectories describing a planned geometry and/or speed for a potential path of the vehicle, actual locations of the vehicle at different times, actual orientations/headings of the vehicle at different times, actual speeds, accelerations and decelerations of the vehicle at different times, classifications of and responses to perceived objects, behavior predictions of perceived objects, status of various systems (such as acceleration, deceleration, perception, steering, signaling, routing, planning, power, etc.) of the vehicle at different times including logged errors, inputs to and outputs of the various systems of the vehicle at different times, etc. As such, these events and the sensor data may be used to "recreate" the vehicle's environment, including perceived objects, and behavior of a vehicle in a simulation. In some instances, the log data may be annotated with information identifying behaviors of the autonomous vehicle, such as passing, changing lanes, merging, etc., as well as with information identifying behaviors of other agents or objects in the log data, such as passing or overtaking the autonomous vehicle, changing lanes, merging, etc. In addition or alternatively, the "log data" may be simulated, that is may be created by a human operator as opposed to being generated from a real vehicle driving in the world.

The log data may be used by the server computing devices 410 to run simulations. These simulations may be log-based simulations which are run using actual log data collected by a vehicle over some brief period of time as the vehicle approaches a destination or simulated log data. At the same time, the actual vehicle is replaced with a virtual or simulated autonomous vehicle which can make decisions using the autonomous vehicle control software. By using simulations, the autonomous vehicle control software can be rigorously evaluated.

The log data and/or results of a simulation based on actual or simulated log data may include or be otherwise associated with an identified pullover location selected by the autonomous vehicle control software. In this regard, the storage system 450 may also store this information. In some instances, the actual or simulated vehicle may not actually be able to stop in the identified pullover location due to some circumstance such as an occluded object in the pullover location, etc. In such cases, the identified pullover location may be used for evaluation purposes, even when it is not the "true" pullover location for the actual or simulated vehicle.

In addition, the storage system 450 may also store an evaluation framework (e.g. software for evaluating pullover locations for autonomous vehicles), one or more versions of the aforementioned map information, as well as the autonomous control software which is to be used by vehicles, such as vehicle 100, to operate a vehicle in an autonomous driving mode. This autonomous control software stored in the storage system 450 may include a plurality of different versions including those which have not yet been evaluated or validated. Once validated, the autonomous control software may be sent, for instance, to memory 130 of vehicle 100 in order to be used by computing devices 110 to control vehicle 100 in an autonomous driving mode.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 10:
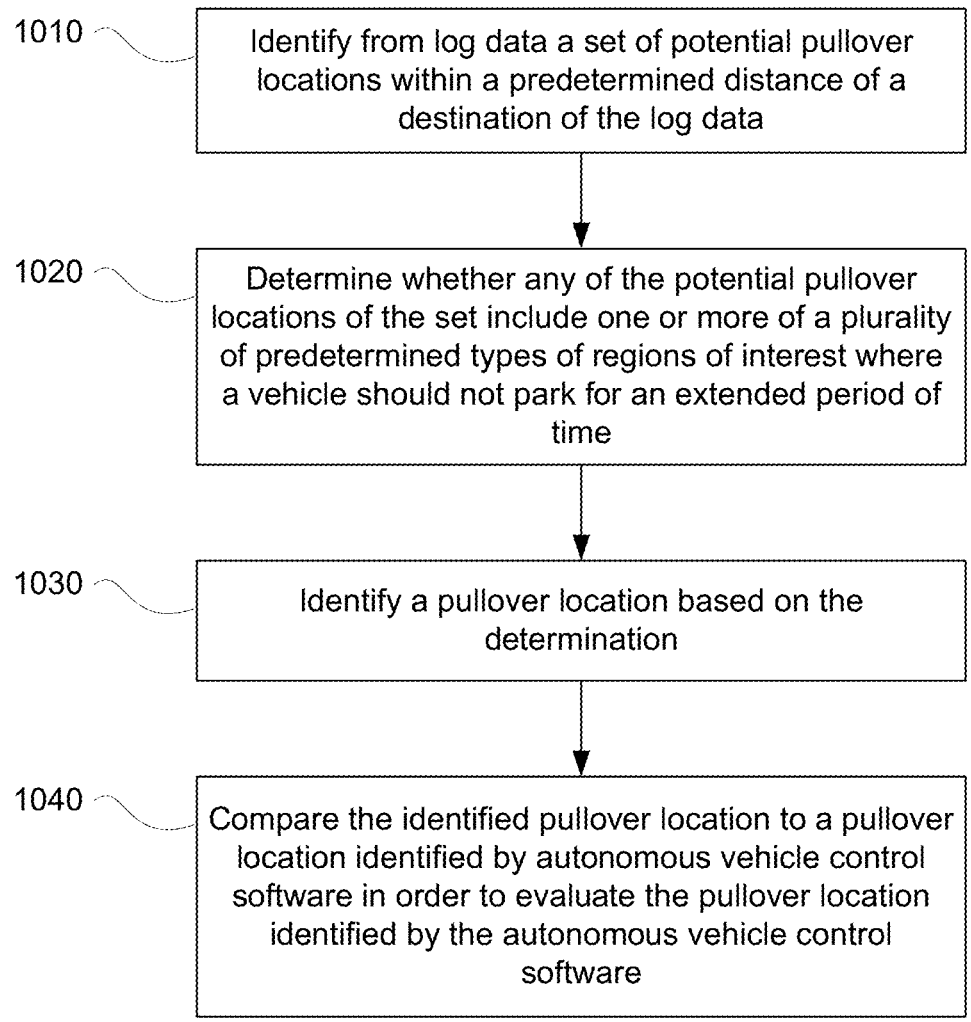
FIG. 10 is an example flow diagram in accordance with aspects of the disclosure.

FIG. 10 is an example flow diagram 1000 for evaluating pullover locations for autonomous vehicles, which may be performed by one or more processors of one or more computing devices, such as the processors of the server computing devices 410. At block 1010, a set of potential pullover locations within a predetermined distance of a destination of log data is identified from the log data. Using the simulated or actual log data stored in the storage system 450, the server computing devices 410 may use the evaluation framework to identify a set of potential pullover locations within a predetermined distance of the destination, such as 35 meters, 40 meters, 50 meters or more or less. Alternatively, the set of potential pullover locations may be identified within a predetermined distance of a destination that is the actual pullover location identified and used by an autonomous vehicle or identified by the autonomous vehicle control software in simulation.

Within the predetermined distance, an area adjacent to the edge of a roadway may be evaluated to determine whether the edge is occupied by an object. For example, the log data may identify a route and a destination for a simulated vehicle or an actual vehicle that captured the log data as well as information identifying objects. The route may be used to identify edges in the map information. These edges as well as connected edges beyond the destination for some predetermined distance, such as 30 meters, 35 meters, 40 meters or more or less, may be used as a baseline for identifying potential pullover locations.

Figure 6:
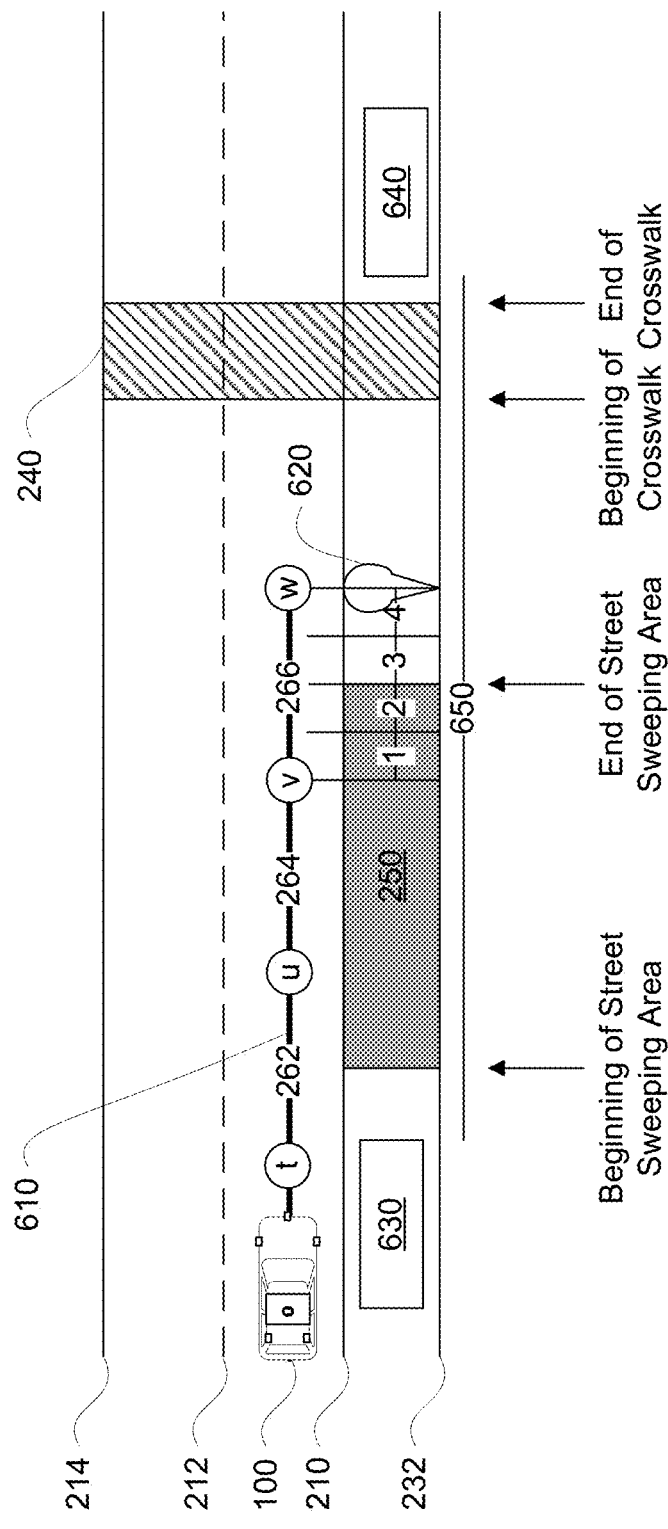
FIG. 6 is an example of log data in accordance with aspects of the disclosure.

This may be done by splicing the edges of the map information along the baseline into discrete sections of a predetermined length every 0.5 meters or more or less and determining whether any objects (e.g. vehicles, pedestrians, cones, etc.) are located within an area where the autonomous vehicle would be if parked adjacent to the edge within those sections. In this regard, the splices may actually be significantly shorter than the autonomous vehicles of the transportation system (e.g. vehicle 100). However, for each splice, the area analyzed to determine whether a curb is occupied may actually be defined by a two-dimensional area or three-dimensional volume where the autonomous vehicle would be located if some reference point on the autonomous vehicle, such as the front bumper or rear axle, was positioned within that splice, at the start of that splice, or at the end of that splice. By choosing a single point for each splice and therefore each potential pullover location (discussed further below), the vehicle may control itself so that the vehicle's front bumper or rear axle will be at that point when stopped in the pullover location. FIG. 6 represents example log data 600. The log data includes vehicle 100 following a route 610 which traverses edges 260, 262, 264, 266 in the map information order to reach a destination identified by the marker 620. In this regard, these edges as well as edges 268, 270, 272 (shown in FIG. 2B) beyond the destination may be used as a "baseline" for identifying areas adjacent to the edge of a roadway which are unoccupied by objects in the log data. As such, each of these edges may be subdivided into a plurality of splices as described above.

FIG. 6 depicts an example of the area adjacent to edge 266 subdivided into 4 splices 1, 2, 3, 4 as an example only. It will be appreciated that each of the edges 260, 262, 264, 266, 268, 270, 272 may also be subdivided into such splices. Each splice may be analyzed using the objects identified in the log data, such as parked vehicles 630, 640, in order to identify areas, such as area 650 (shown as offset for clarity), along the curb 232 which are unoccupied.

Any adjacent unoccupied splices can be "merged" into a larger section when the vehicle was parked in each of those splices the 2D area or 3D volume of the autonomous vehicle would at least partially overlap with a region of interest of a common type (e.g. the same type) or no regions of interest.

Any unoccupied unmerged splices including the area taken up by the autonomous vehicle if the autonomous vehicle were to park in the unmerged splices as well as any merged splices including the area taken up by the autonomous vehicle if the autonomous vehicle were to park in the merged splices may be identified as potential pullover locations. As such these potential pullover locations may be as long as the autonomous vehicle and may be defined using a particular point on the vehicle such as the rear axle or some other location, and need not include additional distance to enable an autonomous vehicle to actually maneuver into the potential pullover location. However, unoccupied splices that are within a predetermined distance of another object, such as a parked vehicle, may be discarded in order to account for the space needed for the pullover maneuver or for differences between vehicles/software version capabilities. This "buffer" area may be selected by human operators based on historical or other data.

Figure 7:
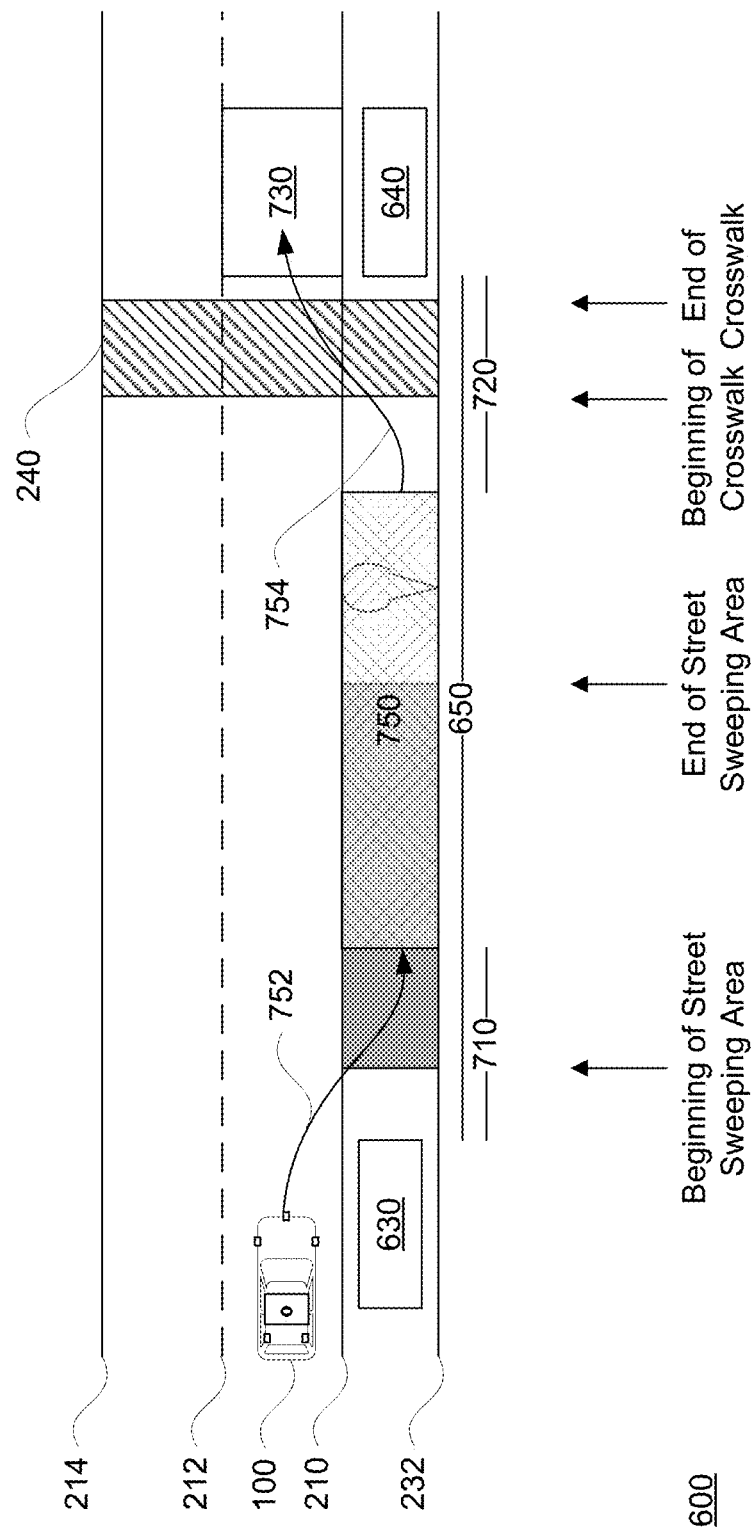
FIG. 7 is another example of log data in accordance with aspects of the disclosure.

For example, as shown in FIG. 7, vehicle 100 may need at least the distance corresponding to path 752 (or buffer area 710) in order to maneuver around parked vehicle 630. Similarly, vehicle 100 may need at least the distance corresponding to path 754 (or buffer area 710) in order to maneuver around parked vehicle 640. In this regard, buffer areas 710, 720 may be subtracted or otherwise removed from the area 650 resulting in the area 750 (depicted with hash marks) along the curb 232 being an open curb. This area 750 may thus represent a potential pullover location.

Returning to FIG. 10, at block 1020, whether any of the potential pullover locations of the set include one or more of a plurality of predetermined types of regions of interest. For each potential pullover location of the set, the potential pullover location may be analyzed by the server computing devices 410 to determine whether the potential pullover location includes or at least partially overlaps with a region of interest. These regions of interest may be identified in pre-stored map information used by the autonomous vehicle control software to control the vehicle and/or from other sources of information. For example, returning to FIG. 7, the area 750 at least partially overlaps with a region of interest; street sweeping area 240.

Returning to FIG. 10, at block 1030, a pullover location is identified based on the determination. The set of potential pullover locations may then be evaluated by the server computing devices 410 to identify a pullover location. This pullover location may be one of the set of potential pullover locations or may actually be a location where the vehicle simply double parks adjacent to one of the set of potential pullover locations. To identify the pullover location, each potential pullover location of the set may be categorized into one of the ranked buckets for the worst ranked region of interest that at least partially overlaps with the potential pullover location in order to identify the "best" pullover location. This evaluation may start by looking for the highest ranked potential pullover location and working downwards from there.

Each type of region of interest may be classified into one of a plurality of ranked buckets. In some instances, a single ranked bucket may include a plurality of different types of regions of interest. As an example, if there are 5 ranked buckets, the ranked buckets may be arranged from "A" to "E", where the "A" ranked bucket represents the least desirable pullover locations, such as those where the likelihood of encountering vulnerable road users such as pedestrians or bicyclists is even greater, and the "E" ranked bucket represents the most preferred pullover locations, such as those that do not at least partially overlap with any regions of interest and/or those that overlap with regions of interest that are most preferred for pullovers such as parking lots and/or designated parking spaces. The ranked buckets may thus be arranged from the most preferred regions of interest (e.g. a parking lot or designated parking space), to permissible but less desirable regions of interest (e.g. those in street sweeping areas), to even less desirable due to the likelihood of encountering vulnerable road users such as pedestrians or bicyclists (e.g. those adjacent to residential driveways), to the least desirable locations such as where the likelihood of encountering vulnerable road users such as pedestrians or bicyclists is even greater (e.g. those adjacent to bicycle lanes or near crosswalks).

Some regions of interest may be excluded as potential pullover locations. For example, some regions of interest may present significant safety concerns (e.g. unsafe), such as crosswalks or railroad tracks, and may simply be automatically excluded from the set of potential pullover locations and therefore never chosen. In other words, it may be better to drive further away from the destination to stop or to even cancel a trip than to stop at such locations. Of course, some regions of interest may be excluded for any number of factors including, for instance, the laws of the jurisdiction in which an autonomous vehicle is driving, the policies and procedures of the transportation service, the level of detail to which such regions of interested are pre-mapped (e.g. included in the map information used by the autonomous vehicles), and if not always pre-mapped, potentially, whether such regions of interest can be detected and identified in real time by the autonomous vehicle. Thus, the same transportation service may utilize different regions of interest for different geographic areas (e.g. different neighborhoods or cities, different service areas for the autonomous vehicles, etc.) or for autonomous vehicles with different capabilities (e.g. different hardware such as sensors or software versions).

The rankings for buckets and the corresponding regions of interest may depend upon a plurality of factors including, for instance, the laws of the jurisdiction in which an autonomous vehicle is driving, the policies and procedures of the transportation service, the level of detail to which such regions of interested are pre-mapped (e.g. included in the map information used by the autonomous vehicles), and if not always pre-mapped, potentially, whether such regions of interest can be detected and identified in real time by the autonomous vehicle. Thus, the same transportation service may utilize different sets of ranked buckets for different geographic areas (e.g. different neighborhoods or cities, different service areas for the autonomous vehicles, etc.) or for autonomous vehicles with different capabilities (e.g. different hardware such as sensors or software versions).

Figure 8:
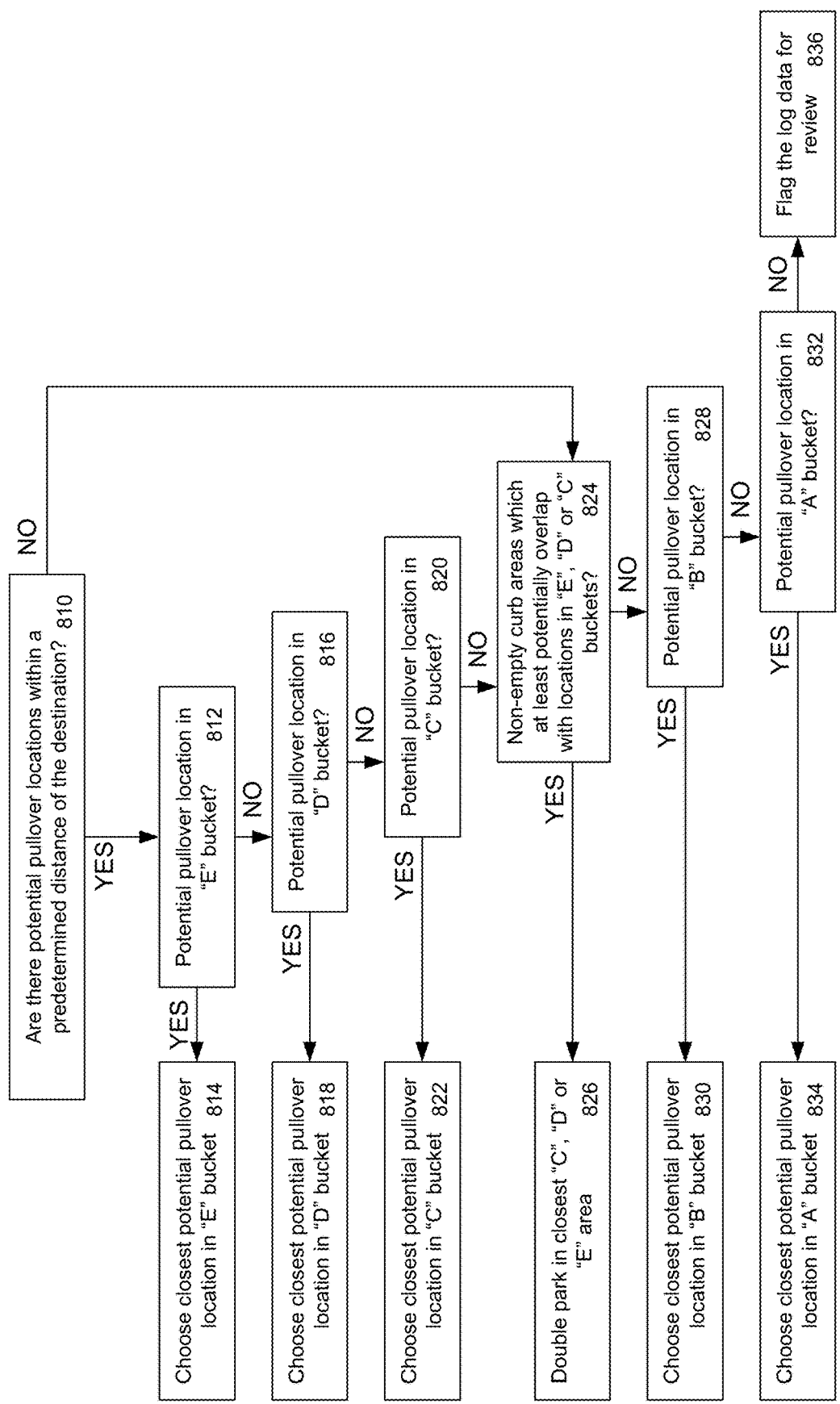
FIG. 8 is an example of an evaluation process in accordance with aspects of the disclosure.

FIG. 8 is an example of an evaluation process which may be implemented by the one or more server computing devices. In the example of FIG. 8, stopping in regions of interest associated with ranked buckets "E", "D" and "C" are considered better than double parking, and double parking is considered better than stopping in the regions of interest associated with ranked buckets "B" and "A". Starting at block 810, the evaluation process includes determining whether there are potential pullover locations within a predetermined distance of a destination. As noted above, this destination may be defined in the log data. The potential pullover locations may be considered a set of potential pullover locations, and may be identified as described in the examples above.

If at block 810, there are such potential pullover locations ("YES"), the evaluation process moves to block 812. At block 812, the evaluation process includes determining whether there are any potential pullover locations of the set of potential pullover locations that would be categorized in the "E" ranked bucket or as noted above, the most preferred location to pullover. If so ("YES"), the evaluation process moves to block 814, and the potential pullover location categorized in the "E" ranked bucket and which is closest to the destination may be chosen or identified as the pullover location.

If at block 812, there are no such potential pullover locations ("NO"), the evaluation process moves to block 816. At block 816, the evaluation process includes determining whether there are any potential pullover locations of the set of potential pullover locations that would be categorized in the "D" ranked bucket or as noted above, the next least potentially dangerous or most acceptable location to pullover after those in the "E" ranked bucket. If so ("YES"), the evaluation process moves to block 818, and the potential pullover location categorized in the "D" ranked bucket and which is closest to the destination may be chosen or identified as the pullover location.

If at block 816, there are no such potential pullover locations ("NO"), the evaluation process moves to block 820. At block 820, the evaluation process includes determining whether there are any potential pullover locations of the set of potential pullover locations that would be categorized in the "C" ranked bucket or as noted above, the next least potentially dangerous or most acceptable location to pullover after those in the "D" ranked bucket. If so ("YES"), the evaluation process moves to block 822, and the potential pullover location categorized in the "C" ranked bucket and which is closest to the destination may be chosen or identified as the pullover location.

If at block 820, there are no such potential pullover locations ("NO"), the evaluation process moves to block 824. At block 824, the evaluation process includes determining whether there are any non-empty curb areas which at least partially overlap with regions of interest that would result in the non-empty curb areas being categorized in any of the "E", "D" or "C" ranked buckets, or rather, would not at least partially overlap with regions of interest that would result in the non-empty curb areas being categorized in any of the "A" or "B" ranked buckets. If so ("YES"), the evaluation process moves to block 826, and the non-empty curb area categorized in the "E", "D" or "C" ranked bucket which is closest to the destination may be chosen or identified as the pullover location. The server computing devices may identify non-empty curb areas as those that are specifically occupied by a parked vehicle. For example, turning to FIG. 8, this would include the area 730 in lane 220 adjacent to vehicle 640. As such, the result, the server computing devices 410 would identify a pullover location where a vehicle would be double-parking as indicated in block 826.

If at block 824, there are no such non-empty curb areas ("NO"), the evaluation process moves to block 828. At block 828, the evaluation process includes determining whether there are any potential pullover locations of the set of potential pullover locations that would be categorized in the "B" ranked bucket or as noted above, the next least potentially dangerous or most acceptable location to pullover after those in the "C" ranked bucket. If so ("YES"), the evaluation process moves to block 830, and the potential pullover location categorized in the "B" ranked bucket and which is closest to the destination may be chosen or identified as the pullover location.

If at block 828, there are no such potential pullover locations ("NO"), the evaluation process moves to block 832. At block 832, the evaluation process includes determining whether there are any potential pullover locations of the set of potential pullover locations that would be categorized in the "A" ranked bucket or as noted above, the next least potentially dangerous or most acceptable location to pullover after those in the "B" ranked bucket. If so ("YES"), the evaluation process moves to block 834, and the potential pullover location categorized in the "A" ranked bucket and which is closest to the destination may be chosen or identified as the pullover location.

If at block 832, there are no such potential pullover locations ("NO"), the evaluation process moves to block 836, where the log data may be flagged for further review. In other words, the server computing devices 410 would not have been able to identify a pullover location for the log data, and thus, this may warrant further review of the log data.

As noted above, the example of FIG. 8, stopping in regions of interest associated with ranked buckets "E", "D" and "C" are considered better than double parking, and double parking is considered better than stopping in the regions of interest associated with ranked buckets "B" and "A". Thus, the evaluation process of FIG. 8 may be very different depending upon the number of ranked buckets, including the number of different types of ranked buckets including regions of interest that are considered by the transportation service to be better or worse than double parking.

Moreover, as with the rankings for buckets, how the evaluation process is arranged may depend upon a plurality of factors including, for instance, the laws of the jurisdiction in which an autonomous vehicle is driving, the policies and procedures of the transportation service, the level of detail to which such regions of interested are pre-mapped (e.g. included in the map information used by the autonomous vehicles), and if not always pre-mapped, potentially, whether such regions of interest can be detected and identified in real time by the autonomous vehicle. Thus, the same transportation service may utilize different evaluation processes for different geographic areas (e.g. different neighborhoods or cities, different service areas for the autonomous vehicles, etc.) or for autonomous vehicles with different capabilities (e.g. different hardware such as sensors or software versions).

Exactly how the evaluation process proceeds may also be based on the characteristics of the area around the destination. For instance, if there is a bicycle lane or other features adjacent to the potential pullover locations of the set of pullover locations such considerations may also be taken into account. For example, in some alternatives, potential pullover locations may also be evaluated based on whether they would require a vehicle to cross over or enter into a bicycle lane, if so, these potential pullover locations may be less desirable than those that do not require a vehicle to cross over or enter into a bicycle lane. Thus, the server computing devices 410 may identify a pullover location that is farther from the destination even when there is a potential pullover location that is closer to the destination but would require a vehicle to crossover or enter into a bicycle lane.

Similarly, returning to the example of FIG. 8, if there are no potential pullover locations that at least potentially overlap with locations in "E", "D" or "C" ranked buckets at block 824, double parking adjacent to a bicycle lane or at least partially within a bicycle lane may be less desirable than double parking in a location that is not adjacent to a bicycle lane or at least partially within a bicycle lane. Thus, the server computing devices 410 would identify a pullover location where a vehicle would double park that is farther from the destination even when there is a potential pullover location where a vehicle would double park that is closer to the destination but would require a vehicle to stop adjacent to a bicycle lane or at least partially within a bicycle lane.

Returning to FIG. 10, at block 1040, the identified pullover location is compared to a pullover location identified by autonomous vehicle control software in order to evaluate the pullover location identified by the autonomous vehicle control software. The identified pullover location may be compared by the server computing devices 410 to the actual pullover location identified and used by the autonomous vehicle control software of the vehicle 100 or identified by the autonomous vehicle control software in simulation. The results of the comparisons may be used to determine or label whether a simulated or actual pullover was a success or a failure.

As noted above, the success or failure of a particular pullover selection may be defined relatively. A seemingly "bad" pullover location might be the best of bad options. For example, although a preference would be to always pull over next to the curb at the destination, in cases where no empty curb is available, double-parking may be preferred to pulling over far away, or failing to pull over at all. In this regard, a "failure" may include a situation where there is an acceptable (e.g. within a predetermined distance in time and/or space of the destination) spot that is closer to the destination and the same ranked bucket or a higher ranked bucket even if farther from the destination. As such, a "success" may include a situation in which no better pullover location is found. The actual location was the highest ranked pullover location or at least there was no other high-ranking pullover location. Situations in which all pullover locations within the predetermined distance are considered unsafe or there are none available, may be considered neither a success nor a failure, but rather may suggest an issue with the destination itself and may be flagged for review as shown in FIG. 8.

Figure 9A:
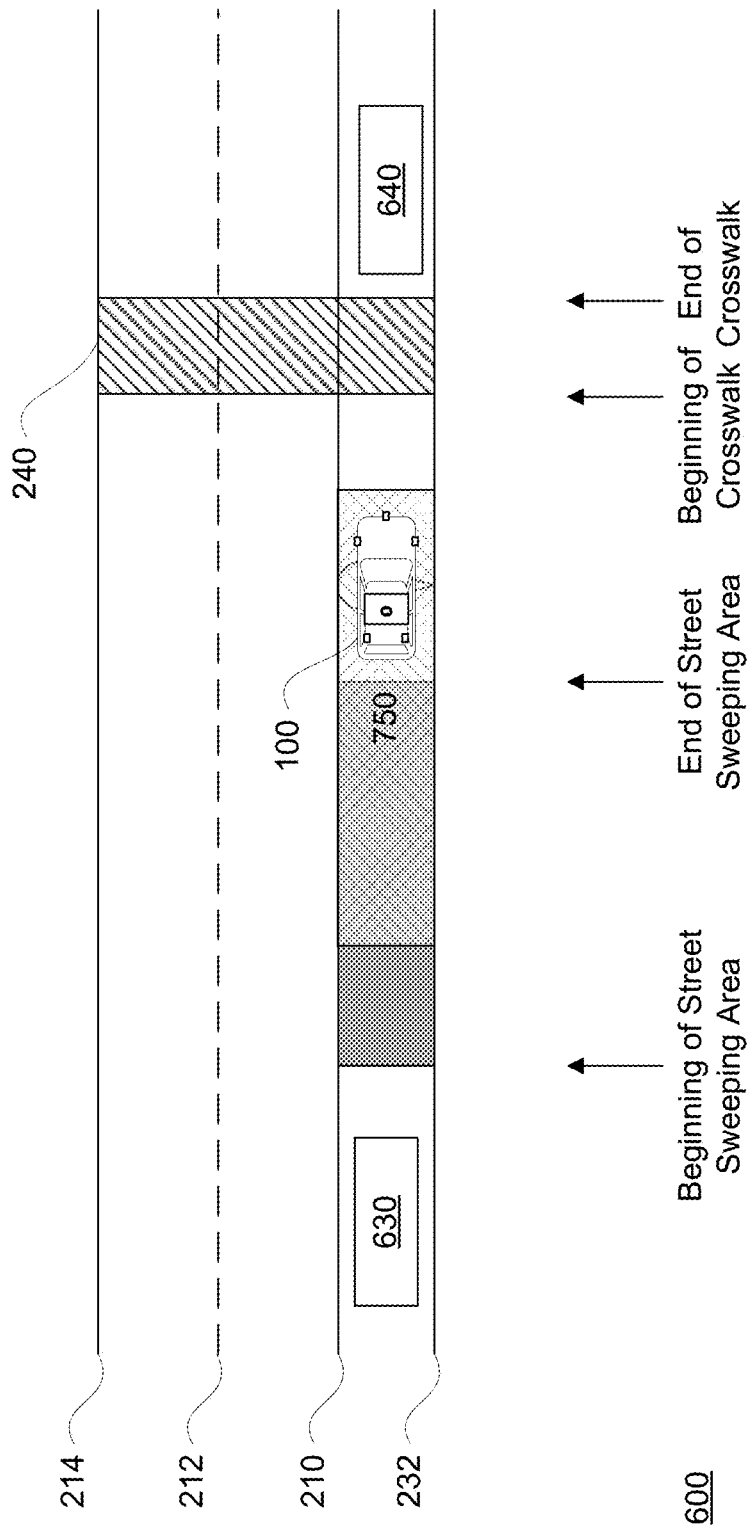
FIGS. 9A and 9B are further examples of log data in accordance with aspects of the disclosure.
Figure 9B:
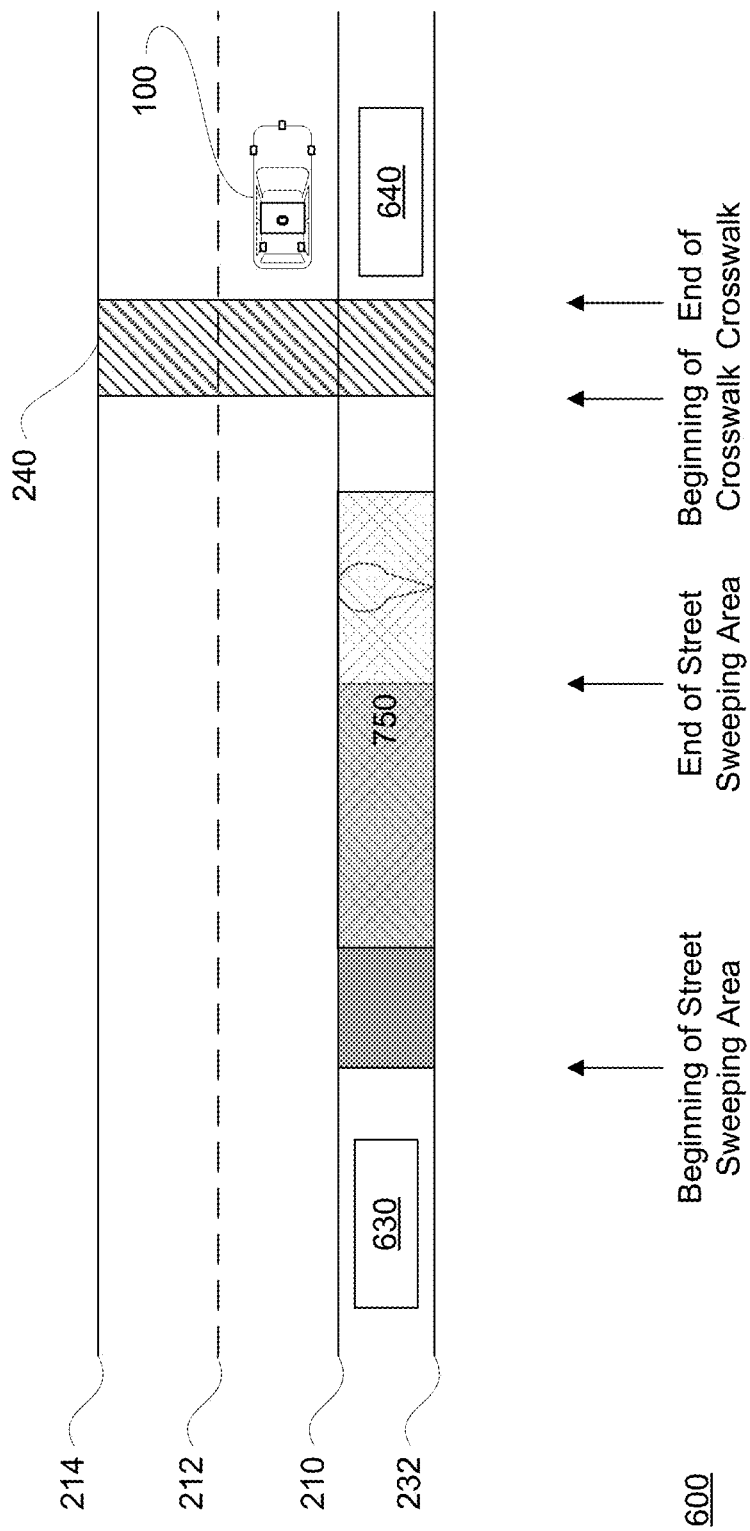

For example, turning to FIG. 9A, if, according to the log data, the vehicle 100 parked anywhere within the area 750, this would be determined to be a success. However, if according to the log data, the vehicle 100 was not able to park within the area 750 and passed the destination as depicted in the example of FIG. 9B and double parked adjacent to the parked vehicle 640, this may be considered a failure.

The labels and regions of interest may be used for any number of purposes. For example, the labels may be used by the server computing devices 410 to determine success and failure rates for different versions of the autonomous vehicle control software. As one example, a success rate (SuccessRate) may be determined using the equation:

$$SuccessRate = \frac{\# \text{ Successes}}{(\# \text{ Successes} + \# \text{ Failures})}$$

In this example, #Successes may be the number of successes, and #Failures may be the number of failures. As another example, a failure rate may be determined using the equation:

$$FailureRate = \frac{\# \text{ Failures}}{(\# \text{ Successes} + \# \text{ Failures})}$$

As another example, the regions of interest may be used by the server computing devices 410 to determine the frequency with which the evaluation framework identifies pullover locations with a particular type of region or interest as well as the frequency with which a particular version of the autonomous vehicle control software selects a particular type of region of interest. For increases in the rates of failures, the data may be analyzed by the server computing devices 410 to determine "how much worse" the autonomous vehicle control software performed as compared to the evaluation framework or prior versions of the software, compare the regions of interest between the selected pullover locations of the autonomous vehicle control software and the evaluation framework, as well as the distribution of differences in the distances to the destination.

This information in turn may enable engineers to evaluate which parts of the autonomous vehicle control software or cost function (e.g. which costs were higher for the pullover location selected by the autonomous vehicle control software as compared to the pullover location selected by the evaluation framework) caused an increase in failures (e.g. planning, routing, etc.). This in turn, may better enable engineers to adjust or update the autonomous vehicle control software and/or the costs.

The evaluation framework may also allow engineers to "experiment". For example, engineers may increase or decrease the ranked buckets of a particular region of interest and seeing how that affects the success and failure rates of a particular version of autonomous vehicle control software or different versions of the autonomous vehicle control software. In other examples, engineers can experiment with allowing the vehicles to make tighter turning circles, smaller buffers or even different vehicles altogether to see how increased vehicle maneuverability can impact the evaluation.

In some instances, the evaluation framework may allow engineers to identify locations where a vehicle will likely have to select a pullover location which includes less desirable (lower ranked) regions of interest. This information can be reported to cities and may allow planning personnel to identify areas where additional designated parking spaces, parking lots, pickup and/or drop off areas are needed.

The features described herein may allow for the evaluation of pullovers for autonomous vehicles. By doing so, engineers may be able to both determine how changes to autonomous vehicle control software affect how an autonomous vehicle selects pullover locations as well as to implement improvements in selecting pullover locations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   accessing, by one or more processors, pre-stored map information used to control an autonomous vehicle, the pre-stored map information identifying a plurality of predetermined types of regions of interest;
   identifying, by the one or more processors, from log data, a set of potential pullover locations within a predetermined distance of a destination, wherein the log data is collected by the autonomous vehicle as the autonomous vehicle approaches the destination, and wherein the log data identifies a first pullover location selected by autonomous vehicle control software;
   determining, by the one or more processors, which ones of the potential pullover locations of the set include or at least partially overlap with one or more of the plurality of predetermined types of regions of interest identified in the pre-stored map information;
   selecting, by the one or more processors, a second pullover location from the at least one of the potential pullover locations of the set based on the determining;
   comparing, by the one or more processors, the second pullover location to the first pullover location in order to evaluate the first pullover location; and
   adjusting or updating the autonomous vehicle control software based on the evaluation of the first pullover location.

2. The method of claim 1, further comprising:
   evaluating, by the one or more processors, the potential pullover locations in the set to determine whether any of the potential pullover locations can be categorized in a particular one of a plurality of ranked buckets, wherein a potential pullover location categorized in the particular one of the plurality of ranked buckets which is closest to the destination is selected for the log data.

3. The method of claim 2, wherein the buckets are ranked based on suitability for pullovers.

4. The method of claim 1, wherein the destination is a pickup or drop off location for a passenger or good.

5. The method of claim 2, wherein the buckets are ranked based on likelihood of encountering vulnerable road users.

6. The method of claim 1, wherein identifying the set of potential pullover locations includes evaluating a plurality of splices of an edge of a roadway to determine whether any objects are located within an area of each given splice of the plurality of splices where the autonomous vehicle would be if parked adjacent to a portion of the edge of each given splice.

7. The method of claim 6, wherein the splices of the plurality of splices are shorter in length than the autonomous vehicle.

8. The method of claim 7, further comprising merging adjacent splices of the plurality of splices where the autonomous vehicle would overlap with a common type of region of interest if parked adjacent to a portion of the edge of each of the merged adjacent splices.

9. The method of claim 8, wherein identifying the set of potential pullover locations is based on the merged adjacent splices and at least one unmerged splice.

10. The method of claim 1, further comprising, discarding any of the potential pullover locations of the set which at least partially overlap with one of the plurality of predetermined types of regions of interest identified as being unsafe.

11. The method of claim 10, wherein the one of the plurality of predetermined types of regions of interest identified as unsafe includes railroad tracks.

12. The method of claim 1, wherein each of the plurality of predetermined types of regions of interest is associated with a ranked bucket, and wherein selecting the pullover location is further based on the ranked buckets associated with each of the plurality of predetermined types of regions of interest.

13. The method of claim 1, further comprising, identifying, for each given one of the potential pullover locations of the set, one of a plurality of ranked buckets based on any of the plurality of predetermined types of regions of interest which at least partially overlap with the given one of the potential pullover locations of the set, and wherein selecting the pullover location is further based on the identified ones of the plurality of ranked buckets.

14. The method of claim 13, wherein each of the plurality of ranked buckets is associated with one or more of the plurality of predetermined types of regions of interest.

15. The method of claim 1, wherein the second pullover location includes the autonomous vehicle double parking.

16. The method of claim 1, wherein selecting the second pullover location is further based on whether there is a bicycle lane adjacent to the second pullover location.

17. The method of claim 1, wherein evaluating the first pullover location further includes determining whether the first pullover location was a success based on a result of the comparing.

18. The method of claim 1, wherein evaluating the first pullover location further includes determining whether the first pullover location was a failure based on a result of the comparing.

19. The method of claim 1, wherein the adjusting or updating of the autonomous vehicle control software changes at least one of a success rate or a failure rate of the autonomous vehicle control software.

20. A system comprising:
   one or more processors configured to:
      access pre-stored map information used to control an autonomous vehicle, the pre-stored map information identifying a plurality of predetermined types of regions of interest;
      identify from log data a set of potential pullover locations within a predetermined distance of a destination, wherein the log data is collected by the autonomous vehicle as the autonomous vehicle approaches the destination, and wherein the log data identifies a first pullover location selected by autonomous vehicle control software;
      determine which ones of the potential pullover locations of the set include or at least partially overlap with one or more of the plurality of predetermined types of regions of interest identified in the pre-stored map information;

select a second pullover location for the log data from the at least one of the potential pullover locations of the set based on the determination;

compare the second pullover location to the first pullover location in order to evaluate the first pullover location; and adjust or update the autonomous vehicle control software based on the evaluation of the first pullover location.

21. The system of claim 20, wherein the one or more processors are further configured to evaluate the potential pullover locations in the set to determine whether any of the potential pullover locations can be categorized in a particular one of a plurality of ranked buckets, wherein a potential pullover location categorized in the particular one of the plurality of ranked buckets which is closest to the destination is selected for the log data.

22. The system of claim 20, wherein the adjusting or updating of the autonomous vehicle control software changes at least one of a success rate or a failure rate of the autonomous vehicle control software.

* * * * *